Figure 1:
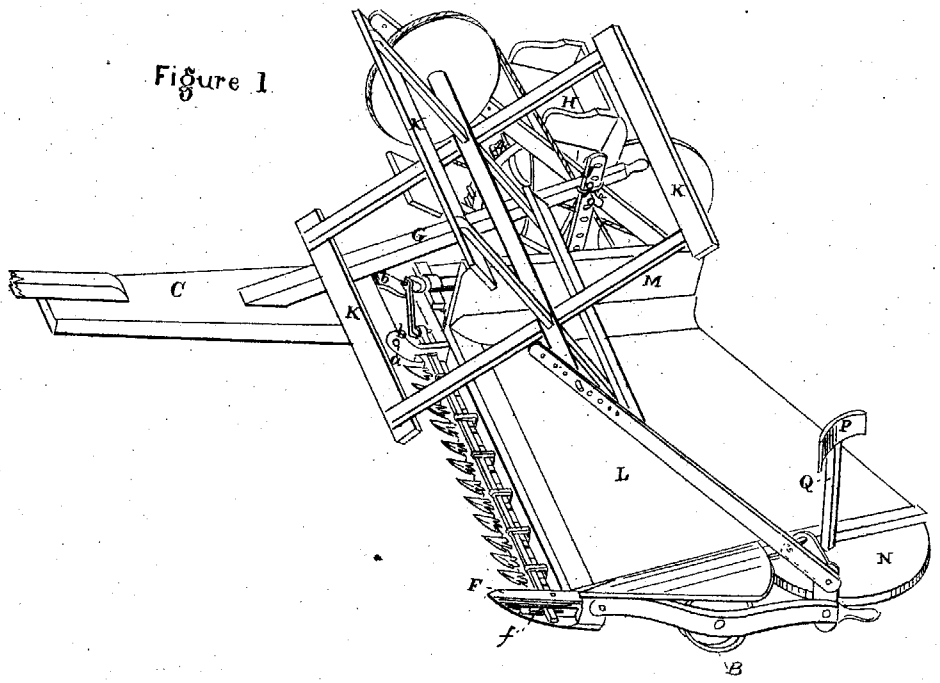

3 Sheets. Sheet.

J. H. Manny.
Mower

No. 299

Reissued Mar. 6. 1855

J. H. Manny,
Mower.

No 299

Reissued Mar. 6. 1855

Fig: 5.

Fig: 3.

Fig: 4

3 Sheets Sheet 3.
J. H. Manny,
Mower.
No 299. Reissued Mar 6. 1855
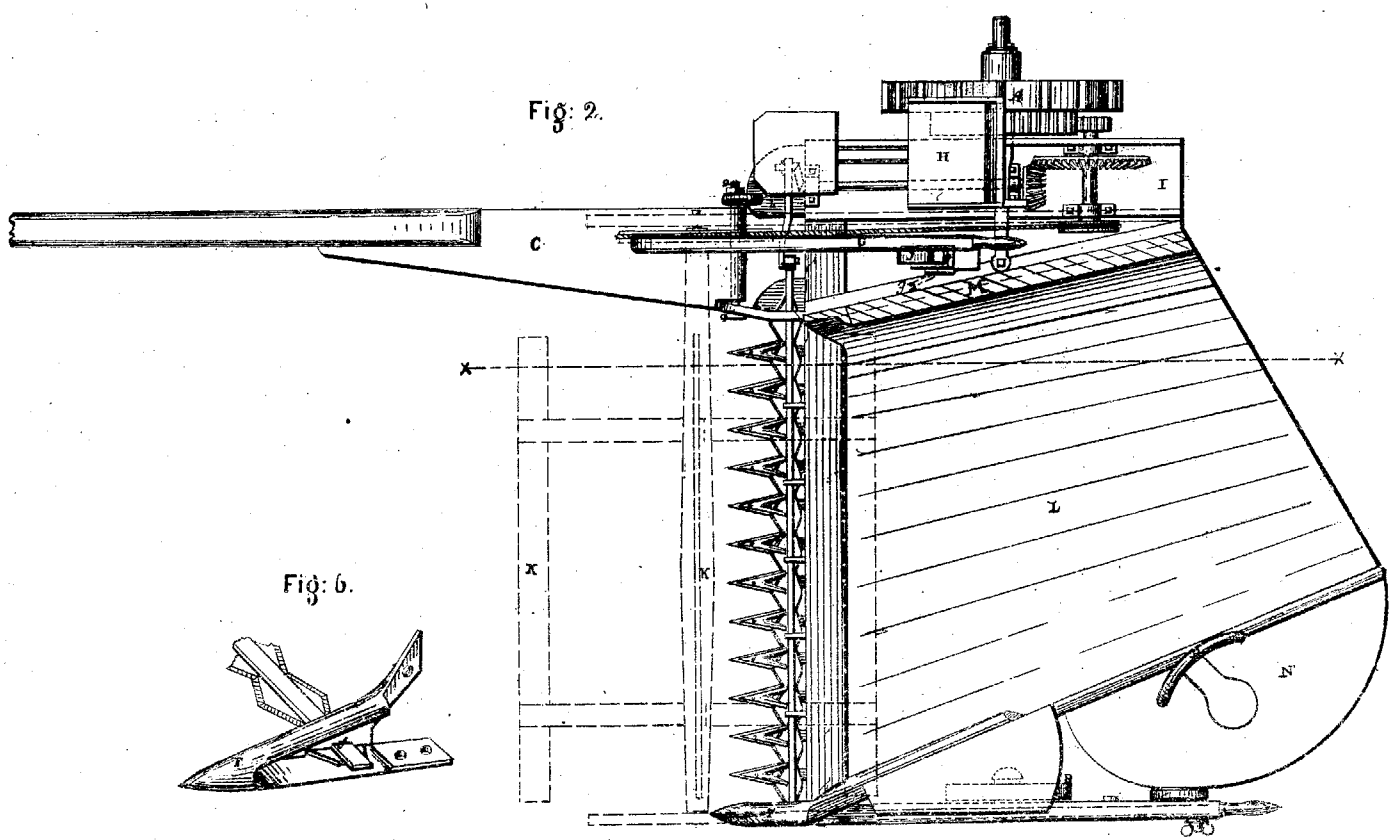

UNITED STATES PATENT OFFICE.

JOHN H. MANNY, OF ROCKFORD, ILLINOIS.

IMPROVEMENT IN GRAIN AND GRASS HARVESTERS.

Specification forming part of Letters Patent No. 11,810, dated October 17, 1854; antedated June 15, 1854; Reissue No. 299, dated March 6, 1855.

DIVISION B.

*To all whom it may concern:*

Be it known that I, JOHN H. MANNY, of Rockford, in the county of Winnebago and State of Illinois, (late of Freeport, in the county of Stephenson, in the same State,) have invented certain new and useful Improvements in Harvesting-Machines, of which the following is a full, clear, and exact description, reference being had to the accompanying drawings, which make part of this specification, and in which—

Figure 1 represents a view in perspective of a machine embracing my improvements. Fig. 2 represents a top view of the same. Fig. 3 represents a rear end view of the same. Fig. 4 represents a section at the line *x x* of Fig. 1, with the fence, guard, or wing of the platform removed to exhibit more clearly the arrangement for adjusting the cutters at varying distances from the ground. Fig. 5 represents a view in perspective of the removable platform and the fence or wing detached from the machine; and Fig. 6 represents a similar view of the hollow dividing-finger at the inner end of the machine and that portion of the end of the sickle or cutter which has its bearing therein.

In reaping-machines made many years ago by various persons, and more recently by McCormick, Seymour and Morgan, and others, seats or stands for a raker to occupy while discharging the grain from the platform have been arranged on the end of the machine most remote from the standing grain, and also at the rear of the platform. Some of the older machines had the raker's stand, seat, or position located on the outer end of the frame, near the end of the reel, the position of the raker being such that after the grain was delivered upon the platform by the reel he could with a free and natural sweep of his arms rake it off and deposit it upon the ground by the side of the machine in suitable quantities for sheaves. In McCormick's and others of the recent machines the raker's seat, as arranged, occupies a position relative to the reel very similar to that of the old machines, the construction and arrangement of some of the parts in comparatively minor particulars being different, and for these differences in construction and arrangement Letters Patent have been granted. Others of the older machines had the seat or position for the raker arranged at the rear of the platform. This was the arrangement adopted by Schnebly, Woodward, and Hite. Among the more recent machines of this class Seymour and Morgan's may be mentioned. These variations in the location of the raker's seat and of the arrangement of the other parts to adapt them to such position of the seat were not made from caprice, but each was a distinct and independent contrivance or invention, because the peculiar organization of different machines required the seat to be differently located in each in order to preserve a proper balance of the machine to allow the raker to discharge the grain with facility from the platform; to allow the machine to accommodate itself properly to inequalities of the surface of the ground; to prevent the machine from being loaded too much on one side or the weight of the raker from being thrown unduly upon the horses; to prevent the frame from being unduly strained, and while accomplishing these objects to dispose the seat so that it will not interfere with the functions of other parts of the machine.

Looking at the numerous conditions to be fulfilled in the location and arrangement of the seat or stand for the person who removes the grain from the platform, it is obvious that from the peculiar organization of several of the machines they were not well adapted to the application of a seat and the problem of locating one properly upon them was difficult to solve, while in others of those machines less difficulty in arranging the seat was experienced.

When I had discovered that the general organization and frame-work of the older machines were defective, I contrived a new and greatly improved frame to support the platform and cutting apparatus, for which in the year 1851 I received Letters Patent of the United States. In constructing and experimenting with my machine with this new organization I found that it was impossible to apply to it with advantage any one of all the different arrangements and locations of the raker's stand or seat before known. In my machine as organized to arrange the seat over the end of the finger piece or bar at the end of the reel, as in McCormick's machine, was impossible, for from that position the attendant could not discharge the grain from the platform of my machine with either a fork or a rake, and, besides, the weight of an attendant at that point would bear so heavily upon the fingers in crossing narrow ridges, or when from any other cause they happen to rest on the ground, that they would be depressed, so as to run the cutter into the ground and dull its edge; and that portion of the weight of the raker in this position that would be thrown upon the horses would be highly objectionable and injurious. This difficulty could not be obviated by moving the axle of the supporting-wheels forward nearer to the finger piece or bar to cause the rear of the frame partially to counterbalance this weight, as such a change would in its turn be inadmissible because of the high angle at which the frame would be thrown when the cutter came to be lowered by adjusting it for mowing. These obstacles to the adoption of anything on the principle of McCormick's location and arrangement of the raker's seat or stand rendered it wholly inapplicable to my machine and precluded me absolutely from adopting it. All other arrangements I found equally inapplicable. The position of the raker in Schnebly's and Woodward's machine is in my machine occupied by the driving-wheel and gearing, and necessarily so in order to locate the axle in the proper place to act as a fulcrum for the platform to turn on. The arrangement and location of the seat in Hite's machine is equally inapplicable to my machine, because, in order to preserve the integrity of my peculiar frame and at the same time discharge the grain at the proper place, the driver's seat would have to be attached to a corner of the platform too remote from the reel and cutters for the attendant to perform the duty of clearing the platform with the requisite facility.

After spending much labor in attempting to apply to my machine some of these previous arrangements and locations of their raker's stand or seat, I was compelled to abandon them and adopt a new one, which cost me much thought and many experiments to invent; but it has answered the purpose for which it was designed very fully and satisfactorily, and possesses many advantages over every other location and arrangement of the raker's or forker's seat.

This improvement of mine consists in combining with the reel which gathers the grain to the cutting apparatus and deposits it upon the platform a seat or position arranged between the inner end of the platform and the end of the machine next the standing grain for an attendant to sit or stand on, and which gives due support to him while operating a fork to push the cut grain toward the outer end of the platform, where the grain is first compressed against a wing or guard provided for the purpose, and then by a lateral movement of the fork discharged properly on the ground behind the platform in gavels, ready to be bound into sheaves. This position for the attendant to occupy in discharging the grain and the manner of discharging it are greatly superior to all previous arrangements and modes of operation for the purpose, because the grain being gathered is compressed against the wing preparatory to being pushed off behind the platform, and reaches the ground in a more compact gavel and a much less number of stalks are scattered than when they are raked off and discharged at the side of the machine without previous compression. A further advantage of this arrangement is that the attendant occupies such a position that both the divider and cutting apparatus are within reach of his fork, so that in case of a root, bush, moss, or other obstruction becoming entangled thereon he can readily detach the same, when it would be impossible for him to do so if he was placed beyond the outer end of the platform, immediately behind the horses, or was located behind the platform and using a rake to discharge the grain at the side of the machine. A still further advantage of this arrangement is that in machines in which it is adopted it has been found that less skill and labor will suffice for the prompt and proper discharge of the grain from the platform; and as the forking of the grain off the platform under this arrangement brings into operation very nearly the same muscles as ordinary forking upon the ground, none of the extraordinary fatigue or lameness is felt by the persons who discharge the grain from the machine which is experienced by those who rake grain from other machines on which they ride back foremost astride of a crotch, and have to continue a strained swinging of the body in an unusual and irksome posture, which to many—among even robust persons—is insupportable for any great length of time.

This new arrangement of the seat possesses other advantages; but the foregoing suffice to show the great importance of my improvement, which obviates many of the defects which have hitherto materially retarded the introduction of the reaper into general use, as the interests of agriculture require.

The accompanying drawings represent a harvesting-machine embracing the improvement which is the subject of the present patent.

The machine is supported on two wheels, A and B, and provided with driving-gear suitable for giving motion to the cutters and reel; but, as the construction and arrangement of the driving-gear and reel are similar to those described in my former patents, I deem it unnecessary to describe them particularly here.

The tongue C, by which the horses draw the machine, is attached to the finger-bar near its outside or right end by means of a bolt, *a*, passing through ears *b* and forming a hinge-joint nearly in a line with the front ends of the guard-fingers, which allows the front of the frame to be elevated or depressed in this line.

On the top of the tongue C is an inclined arm, G, which extends upward and backward within reach of the driver, whose seat H is mounted on the frame I. The tongue and arm together resemble the letter Y, with one limb shorter than the other. The arm G has a staple, *g*, projecting from its side, through which an upright bar, J, passes, whose lower end is hinged to the frame I. This hinged bar J has a series of holes in it, into any one of which a strong pin, $g^2$, is inserted to limit the descent of the arm G on the bar J. By this arrangement it is obvious that, as the front extremity of the tongue is firmly held by the horses, when the arm G is raised or lowered it will impart a corresponding movement to the front edge of the machine, which carries the cutting apparatus, so that the adjustment of the cutters to cut the grain at varying heights is made by raising or lowering the arm G on the bar J and placing the pin $g^2$ beneath it in the proper hole to hold it from falling below the required elevation. The axles of the supporting-wheels constitute the fulcra upon which the frame turns, while the flexure of the machine to vary the adjustment is at the joint which connects the tongue and finger-bar.

The divider F projects on the left side of the machine, in advance of the guard-fingers, and divides the grain to be cut from that which is to be left standing. It has an oblong hole, *f*, made in its inner side, through which the end of the sickle plays. This dividing-bar F is made hollow, as represented, so that excepting the point, which is solid, it is a mere shell. The stock of the sickle has not sufficient length of bearing in the hole *f* in the side of this divider for grass and grain to effect a lodgment and clog the sickle.

The reel K is represented in Fig. 1 by black and in Fig. 2 by dotted lines. The left side of the platform L extends from the left end of the finger-bar and cutters toward the rear of the machine, and as it extends backward inclines toward the right or outer side of the machine, and therefore diverges from the outer end of the frame a sufficient distance to give room in the angle between the two for a stand or seat for the raker. The divergence of this platform from the outer end of the finger-bar and frame, the standing grain is such, that when the cut grain is discharged behind it upon the ground, the gavel will be far enough removed from the standing grain to leave a clear track between them for a horse to travel in on his return while drawing the machine to cut the next swath. On the right or outer side of the oblique platform a fence guard or wing, M, is placed, whose length should be about the same as the platform at that side, and whose inner side should be made concave. This wing, as well as the platform, is removable at will from the frame, so that when the machine is used for mowing both the fence and platform may be taken off. An attendant pushes the cut grain gathered upon the platform with a fork against this concave wing into a compact bundle, and then pitches, slides, or delivers it upon the ground in a compact mass by a lateral movement of the fork.

Between the left side of the platform and the left side of the machine a seat, stand, or position, N, is arranged for the attendant whose duty it is to fork the grain off the platform. This stand may be provided with a seat like that of Hussey's, Randall's, Hite's, or other old machines in case it is thought by any one advisable for the forker to sit, or with a guard-rail, P, on the top of a post, Q, for the forker to steady himself against in case he chooses to stand. This guard-rail may surround the stand, or may be placed only on the side next the platform; but this every competent constructer will determine for himself, as the various forms of supports any one would require to use have been long known and public property, and any one is at liberty to use them. The position of this stand or seat is such that the forker can, if he chooses, push the grain directly back in discharging it in nearly a direct line from the cutters, instead of first pushing it over against the fence to render it more compact. In case the grain is discharged by pushing it directly back a fork with a large number of tines should be used, sufficient to spread nearly the full width of the platform, that the forker may push the cut grain from the whole width of the platform directly backward at a single stroke to deliver the gavel evenly upon the ground behind the platform. This I do not deem as good a mode of discharging the grain as when it is first pushed across the platform against the wing and then shoved back, as the gavel is not so compact; so I prefer to discharge the grain with a common three-tined fork, first pushing it from the left side of the platform to the right, then pressing it against the concave guard to render it more compact, and, lastly, sliding it off endwise upon the ground behind the platform by a lateral movement of the fork.

It is obvious from the foregoing description that my improvement is not simply putting a seat or stand on the machine for the forker, but it is the new arrangement and combination of the different parts to attain the new and useful results referred to; or, in other words, my invention is not broadly the combination of the reel and stand, but their combination as they are arranged.

What I claim is—

The combination of the reel for gathering the grain to the cutting apparatus and depositing it on the platform, with the stand or position for the forker, arranged and located as described, or the equivalent thereof, to enable the forker to fork the grain from the platform and deliver and lay it on the ground at the rear of the machine, as described.

In testimony whereof I have hereunto subscribed my name.

JOHN H. MANNY.

Witnesses:
P. H. WATSON,
A. E. H. JOHNSON.